Sept. 4, 1956  F. A. LEE  2,761,523
COMBINED HOOD PANEL AND FENDER SECTION
Filed Aug. 5, 1952  3 Sheets-Sheet 1

Inventor
Fred A. Lee
By Paul O. Pippel Atty.

Sept. 4, 1956 F. A. LEE 2,761,523
COMBINED HOOD PANEL AND FENDER SECTION
Filed Aug. 5, 1952 3 Sheets-Sheet 2

Inventor
Fred A. Lee
By Paul O. Pippel Atty.

Sept. 4, 1956 F. A. LEE 2,761,523
COMBINED HOOD PANEL AND FENDER SECTION
Filed Aug. 5, 1952 3 Sheets-Sheet 3

Inventor
Fred A. Lee
By Paul O. Pippel Atty.

United States Patent Office 2,761,523
Patented Sept. 4, 1956

2,761,523

COMBINED HOOD PANEL AND FENDER SECTION

Fred A. Lee, Fort Wayne, Ind., assignor to International Harvester Company, a corporation of New Jersey Application August 5, 1952, Serial No. 302,750

10 Claims. (Cl. 180—69)

This invention relates to motor vehicle body construction and more particularly to body structure for enclosing the engine, engine accessories, and the ground-engaging wheels adjacent to the engine.

The present-day trend in motor vehicle design and construction is toward the development of vehicle bodies having a width considerably greater than those previously manufactured. While increasing the width of the vehicle body has tremendously improved the riding comfort of the vehicle occupants, it has also rendered accessibility to the engine and accessories for minor adjustments or major repairs difficult since it is necessary for the mechanic to bridge the vehicle fenders adjacent the engine with his body in order to work on the engine. Obviously many of the engine parts cannot be conveniently reached when the mechanic is partially lying on the relatively wide fenders. This is especially true in the case of motor trucks where comparatively high fenders are employed and the fenders are considered an immovable part of the body structure and entirely independent of the hood panel or covering for the engine enclosure which is movable to gain access to the engine. It is therefore, the primary objective of the present invention to provide a vehicle body front end structure which will allow ready access to the engine and accessories contained in the engine enclosure without the need of departing from present-day styling practices.

To accomplish the above mentioned objective the wheel housings or fenders adjacent each side of the engine enclosure each comprise stationary front and rear sections and a top section which is integrally formed with a pivotally mounted panel which is adapted to cover approximately one-half of the engine enclosure in a lowered position. When the panel is swung to a raised position, the mechanic can assume a comfortable position between the wheel which the panel normally covers and the side wall or partition of the engine enclosure.

A further object is the provision of a sectional fender having a top section integrally formed with a swingable hood panel and a stationary front section supporting a headlamp whereby the top section may be raised to gain access to the engine parts without disturbing or interfering with the electrical wiring for the headlamp.

A still further object is the provision of a fuel tank filler tube which is concealed within a wheel housing but is exposed for convenient filling of the fuel tank when the top section of the wheel housing is raised.

Another object is the provision of a pair of symmetrical panels having a common axis of rotation which is substantially horizontally disposed and longitudinally extending, and which panels normally are positioned to form a covering for the engine enclosure and the top sections of the adjacent wheel housings or fenders.

The foregoing and other important objects and desirable features inherent in and encompassed by the invention, together with many of the purposes and uses thereof, will become readily apparent from a reading of the ensuing description in conjunction with the annexed drawings, in which.

Figures 1, 2:
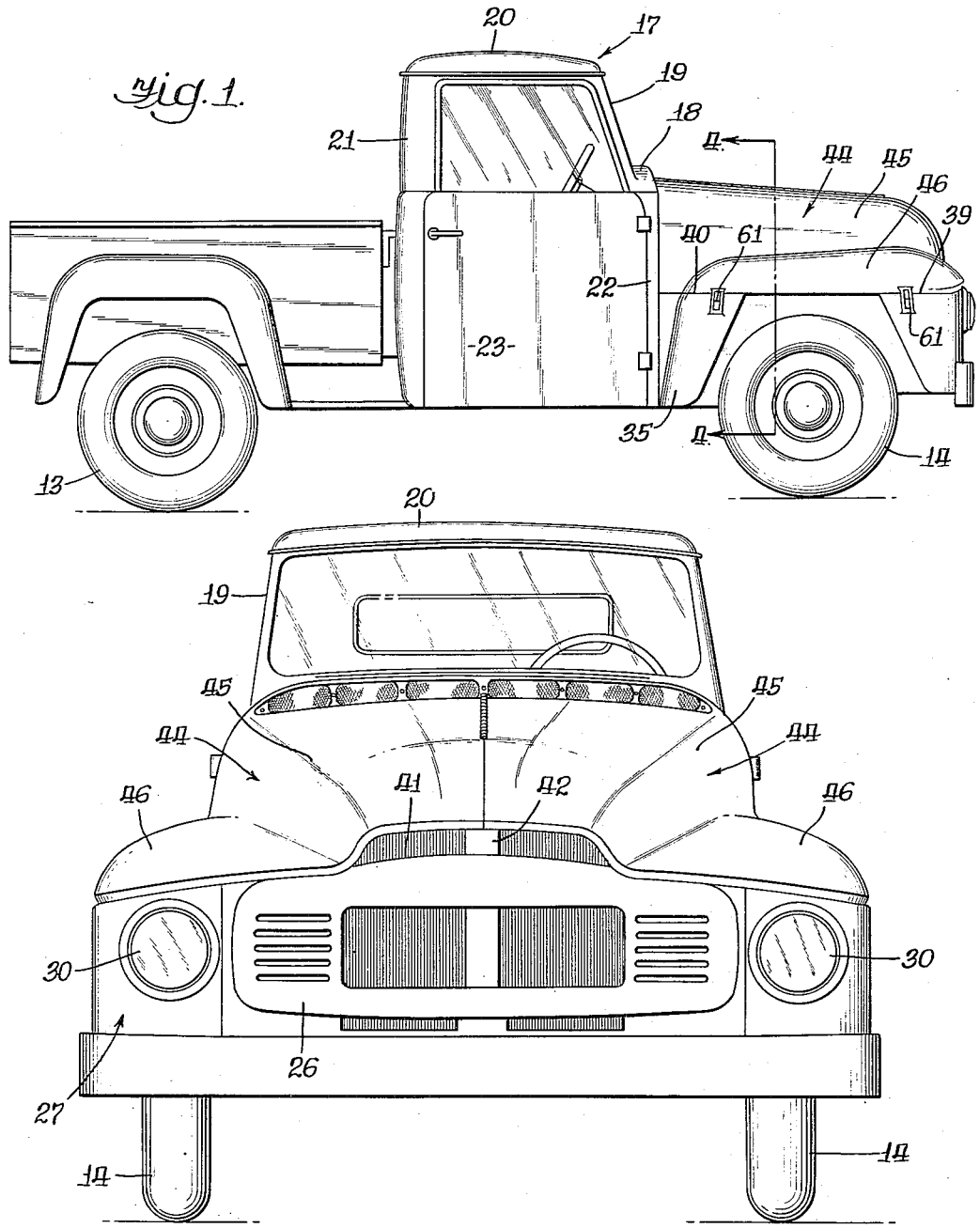
Fig. 1 is a side elevational view of a motor truck embodying the invention.
Fig. 2 is a front elevational view of the motor truck shown in Fig. 1.

Referring to the drawings in detail, wherein like reference characters represent like elements throughout the various views, there is shown a motor truck. The motor truck includes a chassis frame 10 comprising a pair of channel-shaped longitudinally extending, transversely spaced side sill members 11, 12 which are interconnected by means of a plurality of cross members. The chassis frame 10 is resiliently suspended off the road by a pair of rear driving wheels 13 and a pair of steerable front ground-engaging wheels 14 in a conventional manner.

Mounted on the chassis frame 10 at the forward end thereof between the front wheels 14 is the vehicle power plant or engine 15. The engine 15 is shown somewhat diagrammatically since it forms no part of the present invention per se. The engine cooling liquid is circulated through an upright radiator core 16 spaced forwardly of the engine 15.

An operator's compartment, designated generally by numeral 17, is supported by the chassis frame 10 rearwardly of the engine 15 and includes a cowl panel 18 having a windshield frame 19 integrally formed therewith. A roof 20 has a forward edge rigidly secured to the windshield frame 19 and has a rearward edge connected in a like manner to a back panel 21. Depending vertically from the transversely spaced ends of the cowl panel 18 are hinge pillar posts 22 which pivotally support the side doors 23.

Figure 3:
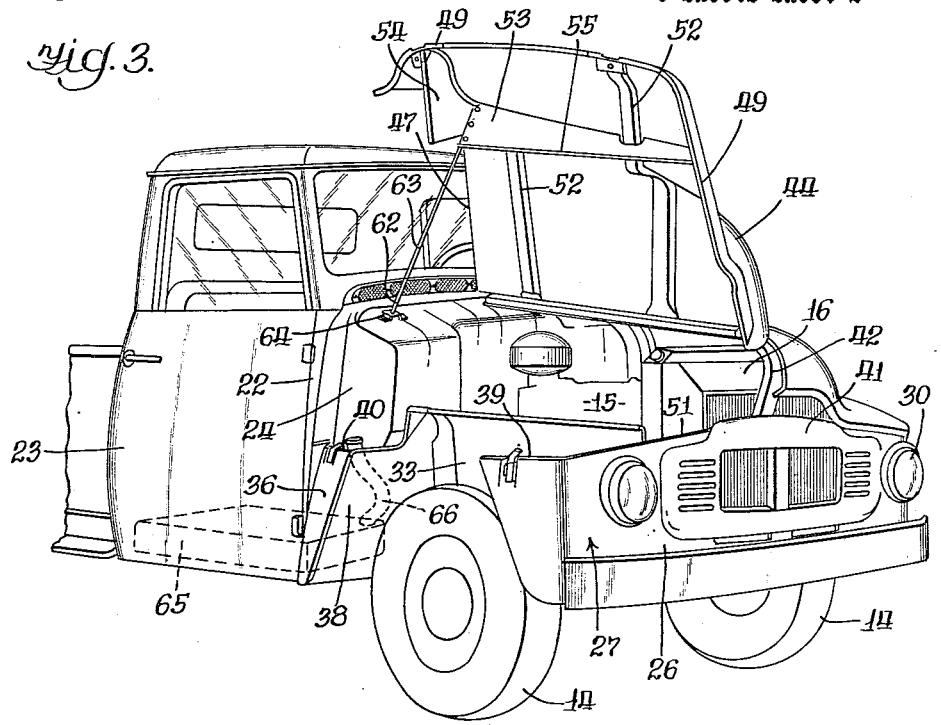
Fig. 3 is a perspective view of a motor truck taken from a point angularly and forwardly thereof showing one of the unitary panels in its raised position.
Figure 5:
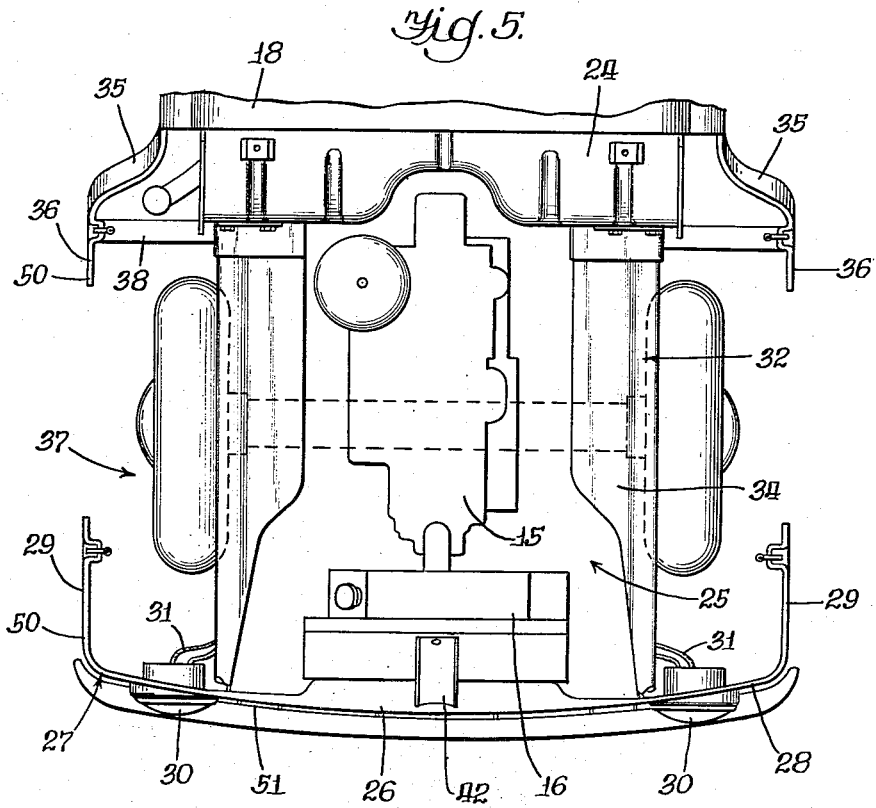
Fig. 5 is a plan view of the forward portion of the motor truck shown in Fig. 1 with the unitary, symmetrical panels removed to better illustrate the accessibility of the engine and accessories.
Figure 6:
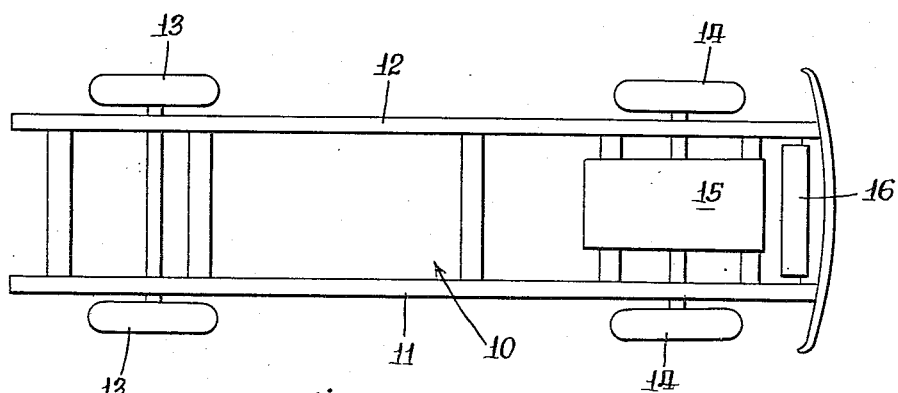
Fig. 6 is a plan view of the chassis frame with the operator's compartment removed.

As best shown in Figs. 3 and 5, a dash panel 24 is secured to the cowl panel 18 and is disposed between the engine 15 and the interior of the operator's compartment 17. The dash panel 24 serves as the rear wall of an engine enclosure, designated generally by numeral 25, to be described presently. The forward wall of the engine enclosure 25 is defined by a generally upright grill panel 26 spaced forwardly of the radiator core 16. Rigidly secured to the transversely spaced ends of the grille panel 26 are lateral extensions 27. As best illustrated in Fig. 5, the lateral extensions 27 are substantially L-shaped in plan to provide transversely extending legs 28 and longitudinally extending legs 29. It will be appreciated that inasmuch as the extensions 27 are rigidly secured to the grill panel 26 which, in turn, is rigidly secured to the chassis frame 10 the extensions 27 are considered immovable parts of the vehicle body. A front headlamp 30 is mounted in each of the transversely extending legs 28 and is connected to the vehicle electrical supply (not shown) by means of conductors 31 (partially shown).

Figure 4:
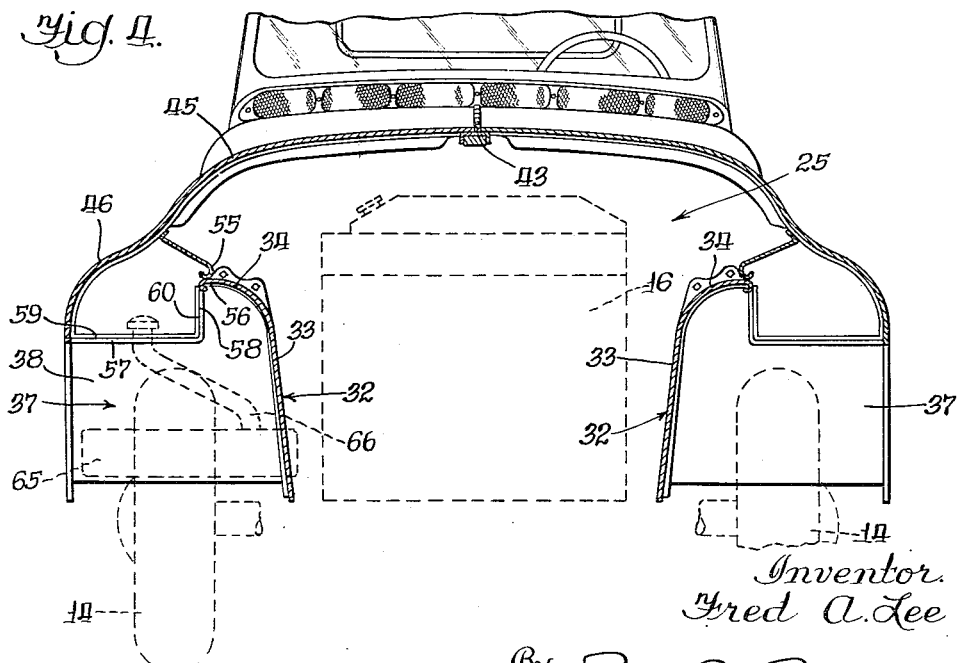
Fig. 4 is a cross sectional end view taken substantially along line 4—4 of Fig. 1.

Referring to Figs. 3, 4, and 5, it will be noted that a splash panel 32 is disposed along each side of the engine 15 and extends longitudinally between and is suitably rigidly attached to the dash panel 24 and the grill panel 26. Each splash panel 32 includes a vertically extending portion 33 integrally formed with an outwardly curved portion 34.

Rigidly secured to each of the hinge pillar posts 22 is a fender section 35 which has an outer contour similar to the rear portion of conventional fenders. It will be noted that one portion 36 of each section 35 is in longitudinal alignment with a respective longitudinally extending leg 29, to thus define one wall of a wheel housing 37. A transversely extending vertical partition 38 is secured to each portion 36 and the splash panel 32 adjacent the portion. It will also be noticed that the top marginal edges 39 and 40 of the legs 29 and 36, respectively, lie within a common horizontal plane.

Extending vertically above the top marginal edge 41 of the central portion of the grill panel 26 is a channel-shaped bar 42 which has its lower end fastened to the grille panel and its upper end projecting rearwardly and supporting one end of a longitudinally extending substantially horizontally disposed hinge pin 43. The opposite end of the hinge pin 43 is supported on the dash panel 24 adjacent the juncture thereof with the cowl panel 18. A pair of symmetrical panels 44 having one of their edges pivotally fastened to the pin 43 extend laterally from the center of the engine enclosure 25 to the vertical planes containing the portions 36 and the legs 29 of the stationary rear and front sections 35 and 27, respectively, to thereby form the top wall 45 of the engine enclosure 25 and the top sections 46 of the wheel housings 37. The rear marginal edge 47 of each of the unitary, symmetrical panels 44 abuts the cowl panel 18 and the hinge pillar post 22 adjacent thereto when in its normal, lowered position as shown in Figs. 1 and 2. The outer peripheral marginal edge 48 is defined by a continuous flange 49 which rests upon complementary flanges 50 formed on the upper edges of the rear and front fender sections 35 and 27 and a portion of a similar flange 51 provided on the upper edge of the grill panel 26. Suitable weather stripping (not shown) may be secured to the swingable panels 44 or the stationary parts along the mating edges thereof. Referring to Fig. 3, it will be observed that a pair of channel-shaped rib members 52 are welded to the underside of each panel 44 to strengthen and to add rigidity to the panel structure. Depending from the underside of each panel 44 and secured thereto are a longitudinally extending upper splash panel 53 and a transversely extending partition 54 which are secured to each other. As illustrated in Fig. 4, when the panels 44 are in their lowered positions the lower edges 55 of the upper splash panels 53 abut the edge 56 of respective curved portions 34 and the edges 57, 58 of each partition 54 mates with complementary edges 59, 60 of a respective vertical partition 38. From the foregoing, it will be apparent that the engine 51, radiator core 16 and other engine accessories are completely enclosed within the engine enclosure 25 when the unitary, symmetrical panels 44 are in their lowered positions and dirt, water and other foreign elements thrown by the wheel 14 during operation of the motor truck are prevented from entering the enclosure and being deposited on the engine and accessories.

Each panel 44 has a pair of lugs carried thereby adjacent the juncture of the panel and the rear and front fender sections 35 and 27 which are engageable by locking members 61 of conventional design to lock the panels in their normal, lowered positions. When it is desired to inspect one side of the engine 15 or make repairs thereto, it is merely necessary to release the locking members 61 from the lugs associated with the panel 44 to be raised. The panel 44 may then be swung to the raised position shown in Fig. 3 to permit a complete and unobstructed access to the engine parts normally covered by the panel. One end 62 of a prop rod 63, pivotally carried by each panel 44, is insertable in a socket 64 secured to the dash panel 24 to maintain the panel 44 in its raised position.

A fuel tank 65 for containing the fuel supply for the engine 15 is secured to the chassis frame 10 beneath the operator's compartment 17 in a conventional manner. A filler tube 66 extends upwardly and forwardly and terminates within one of the wheel housings 37 rearwardly of the vertical partition 38 associated therewith. By arranging the filler tube 66 in the above described manner it is conveniently accessible for filling the fuel tank when the panel 44 covering the same is raised.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A motor vehicle body construction including a sectional fender structure comprising stationary rear and front sections having their upper marginal edges lying in substantially the same horizontal plane, said front sections each supporting a head lamp below their upper marginal edges, a top wall, and a stationary generally vertically disposed splash panel extending between and connected to said rear and front sections; means pivotally connecting said top wall to the vehicle body whereby said top wall is capable of swinging vertically about a substantially horizontal axis from and to a lowered, abutting relationship with said upper marginal edges of said rear and front sections, and said splash panel, the forwardmost and rearwardmost portions of said top wall overlying the front and rear sections, respectively, when said top wall is in its lowered relationship with said front and rear sections.

2. The combination as set forth in claim 1, in which said pivotal axis is disposed in a vertical plane containing the longitudinal center line of said vehicle body.

3. In a motor vehicle having an engine supported by a chassis frame and a ground-engaging wheel adjacent said engine supporting said chassis frame, a part including the top wall of a wheel fender; a generally vertically disposed, longitudinally extending splash panel positioned between said engine and ground engaging wheel; and means pivotally connecting said part to said chassis frame whereby said part is capable of swinging vertically about a substantially horizontal axis from and to a lowered, overlying relationship with said ground-engaging wheel, said part engaging a surface of said splash panel when said part is in its lowered position to provide a partition between said wheel and engine said pivotal axis being spaced vertically above said engine and extending longitudinally with respect to said chassis frame.

4. In a motor vehicle having a pair of laterally spaced ground-engaging wheels and an engine spaced therebetween, a pair of symmetrical, unitary structures, each of said structures including an engine-covering section, a portion overlying an adjacent wheel to serve as the top wall of a wheel fender, and a wall depending from the juncture of said engine-covering section and said top wall; a generally vertically disposed stationary splash panel positioned between each of said wheels and said engine; a single hinge pin attaching said unitary structures to swing about a substantially horizontally disposed axis to and from an engine-covering and wheel-overlying relationship with said engine and wheels, said splash panels having surfaces engageable by the lower edges of said depending walls when the unitary structures are in their engine-covering and wheel-overlying relationship to provide partitions between the wheels and said engine; and mounting means for said hinge pin comprising a stationary grille panel spaced forwardly of said engine having an upwardly and rearwardly extending member secured thereto to provide a support for one end of said hinge pin.

5. In a motor vehicle having a pair of laterally spaced ground-engaging wheels, and an engine and radiator spaced therebetween; a grille panel disposed forwardly of said engine and radiator having lateral extensions, said extensions being substantially L-shaped in plan, one of the legs of each of said extensions supporting a head lamp below the uppermost surface thereof; a stationary rear fender section disposed rearwardly of each of said wheels, each of said rear fender sections having a forwardly facing edge in longitudinal alignment with a leg of a respective extension; a horizontally disposed, longitudinally extending hinge pin having one end supported by said grille panel, and a pair of symmetrical panels pivotally attached to said hinge pin normally positioned to cooperate to form a covering for said engine, radiator, and wheels, each of said symmetrical panels having an edge portion engageable with horizontally disposed surfaces of a respective lateral extension and rear fender section when in its normal position.

6. In a motor vehicle having a pair of laterally spaced, ground-engaging wheels and an engine spaced therebetween; an enclosure for said engine including a generally vertically extending stationary wall section spaced between each of said wheels and said engine; a wheel housing for each of said wheels, each of said housings having front and rear stationary sections, said generally vertically extending wall sections serving as wall portions of the wheel housings; and a pair of symmetrical panels hingedly mounted on said motor vehicle, each of said panels being positionable to serve as substantially one-half of the top wall of said enclosure and the entire top section of an adjacent wheel housing, said panels carrying depending wall sections adapted to abut and cooperate with said stationary wall sections to form separable walls between the engine and wheels.

7. In a motor vehicle having a pair of laterally spaced, ground-engaging wheels, an engine spaced therebetween, and a fuel tank mounted rearwardly of one of said wheels for containing the fuel supply for the engine, said fuel tank having an upwardly and forwardly extending filler tube; an enclosure for said engine including vertically disposed, laterally spaced side wall sections; a wheel housing for each of said wheels, each of said housings having front and rear stationary sections, said side wall sections of said enclosure serving as portions of the inboard walls of the wheel housings, and wall portions of respective front and rear sections being in longitudinal alignment and laterally spaced from a respective side wall section; and a pair of symmetrical panels capable of swinging vertically about a common axis from and to a lowered overlying relationship with said engine and wheels wherein said panels serve as the top wall of said enclosure and the entire top sections of said wheel housings, said fuel tank filler tube being disposed in one of said wheel housings and spaced between one of said side wall sections and one of said wall portions of a rear section.

8. The combination as set forth in claim 7, in which a laterally extending partition interconnecting one of said wall portions of a rear section and one of said side walls is interposed between said filler tube and the wheel spaced forwardly thereof, the uppermost edge of said partition being engageable by one of said panels when said panel is swung to its lowered, overlying relationship with the engine and a wheel.

9. In a motor vehicle having a pair of laterally spaced, ground-engaging wheels and an engine spaced therebetween; an enclosure for said engine comprising a vertical grille panel spaced forwardly of said engine and a pair of transversely spaced longitudinally extending splash panels disposed on each side of said engine; a wheel housing for each of said wheels, each of said wheel housings including a stationary rear section and a front section, each of said front sections extending laterally from and being attached to said grille panel and being substantially L-shaped in plan, wall portions of respective front and rear sections being in longitudinal alignment and laterally spaced from a respective splash panel; a horizontally disposed longitudinally extending hinge pin having one end supported by said grille panel; and a pair of swingable symmetrical structures pivotally connected to said hinge pin forming a top wall for said enclosure and entire top sections for said wheel housings when in a lowered, overlying position, each of said structures having an edge portion engageable with the uppermost surfaces of the wall portions of a respective front section and rear section and said grille panel when in its lowered position, each of said structures further having a longitudinally extending wall section depending therefrom adapted to abut the uppermost edge of a respective splash panel when in its lowered position.

10. The combination as set forth in claim 9, in which a fuel tank is mounted rearwardly of one of said wheel housings for containing the fuel supply for the engine, said fuel tank having a filler tube extending forwardly and upwardly into one of said wheel housings between one of said splash panels and a wall portion of one of said rear sections, and a laterally extending partition interposed between said filler tube and the wheel disposed within said wheel housing, said partition interconnecting said one splash panel and wall portion of said one rear section and having its uppermost edge engageable by one of said structures when in its lowered position.

References Cited in the file of this patent

UNITED STATES PATENTS

| | | |
|---|---|---|
| 1,797,873 | McManus | Mar. 24, 1931 |
| 2,086,172 | Northup | July 6, 1937 |
| 2,413,792 | Sharp | Jan. 7, 1947 |
| 2,563,981 | Walker | Aug. 14, 1951 |
| 2,582,839 | Lippard et al. | Jan. 15, 1952 |
| 2,606,625 | Paton | Aug. 12, 1952 |
| 2,699,223 | Brumbaugh | Jan. 11, 1955 |

FOREIGN PATENTS

| | | |
|---|---|---|
| 764,143 | France | Feb. 26, 1934 |